(12) United States Patent
Simitsis et al.

(10) Patent No.: US 10,795,876 B2
(45) Date of Patent: Oct. 6, 2020

(54) PROCESSING QUERY OF DATABASE AND DATA STREAM

(71) Applicant: Hewlett Packard Enterprise Development LP, Houston, TX (US)

(72) Inventors: Alkiviadis Simitsis, Santa Clara, CA (US); William Kevin Wilkinson, San Mateo, CA (US); Olga Poppe, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 125 days.

(21) Appl. No.: 15/503,482

(22) PCT Filed: Sep. 30, 2014

(86) PCT No.: PCT/US2014/058333
§ 371 (c)(1),
(2) Date: Feb. 13, 2017

(87) PCT Pub. No.: WO2016/053302
PCT Pub. Date: Apr. 7, 2016

(65) Prior Publication Data
US 2017/0235779 A1    Aug. 17, 2017

(51) Int. Cl.
*G06F 7/00* (2006.01)
*G06F 16/23* (2019.01)
(Continued)

(52) U.S. Cl.
CPC ............. *G06F 16/23* (2019.01); *G06F 16/22* (2019.01); *G06F 16/248* (2019.01); *G06F 16/24535* (2019.01); *G06F 16/24568* (2019.01)

(58) Field of Classification Search
CPC ......... G06F 17/30516; G06F 17/30345; G06F 17/30451; G06F 16/248; G06F 16/24535; G06F 16/23
(Continued)

(56) References Cited

U.S. PATENT DOCUMENTS 6,910,032 B2    6/2005    Carlson et al.
7,403,959 B2    7/2008    Nishizawa et al.
(Continued)

OTHER PUBLICATIONS

Chandramouli, B. et al.; "Data Stream Management Systems for Computational Finance"; Dec. 2010; http://research.microsoft.com/pubs/145186/streams-finance-ieee.pdf.
(Continued)

*Primary Examiner* — Md I Uddin
(74) *Attorney, Agent, or Firm* — Hewlett Packard Enterprise Patent Department

(57) ABSTRACT

Example implementations relate to processing a query of a database and a data stream. For example, a computing device may include a processor. The processor may receive a query associated with at least one of a database and a buffer storing streamed data from a data stream. The database may store database data previously stored in the buffer. The processor may identify a range associated with the query and generate a set of sub-queries including at least one of a buffer sub-query if the range is associated with the streamed data in the buffer and a database sub-query if the range is associated with the database data in the database. The processor may process the set of sub-queries and provide a query result of the query, where the query result is a combination of sub-query results of the set of sub-queries.

12 Claims, 3 Drawing Sheets

(51) Int. Cl.
  *G06F 16/22* (2019.01)
  *G06F 16/248* (2019.01)
  *G06F 16/2453* (2019.01)
  *G06F 16/2455* (2019.01)
(58) Field of Classification Search
  USPC .................................. 707/713, 722, 728, 759
  See application file for complete search history.

(56) References Cited

U.S. PATENT DOCUMENTS

| | | | |
|---|---|---|---|
| 7,860,884 B2 | 12/2010 | Lee et al. | |
| 2002/0015093 A1* | 2/2002 | Dureau | H04N 21/235 348/38 |
| 2006/0218123 A1 | 9/2006 | Chowdhuri et al. | |
| 2011/0055239 A1 | 3/2011 | Wolf et al. | |
| 2011/0082675 A1 | 4/2011 | Little et al. | |
| 2012/0078868 A1 | 3/2012 | Chen et al. | |
| 2012/0124096 A1 | 5/2012 | Krishnamurthy et al. | |
| 2013/0091123 A1 | 4/2013 | Chen et al. | |
| 2014/0143501 A1* | 5/2014 | Creamer | G06F 17/3048 711/136 |
| 2014/0310232 A1* | 10/2014 | Plattner | G06F 17/30457 707/602 |

OTHER PUBLICATIONS

Franklin, M.J. et al.; "Continuous Analytics: Rethinking Query Processing in a Network-effect World"; Jan. 4-7, 2009; http://sydney.edu.au/engineering/it/~dbrg/wp-content/papers/CIDR/2009/Paper_122.pdf.

PCT; "Notification of Transmittal of the International Search Report and the Written Opinion of the International Searching Authority, or the Declaration"; PCT/U2014/058333; dated May 27, 2015; 9 pages.

Gehrke et al., "On computing correlated aggregates over continual data streams", SIGMOD Rec., vol. 30, Issue 2, May 2001, pp. 13-24.

Lamb et al., "The Vertica analytic database: C-store 7 years later", PVLDB, vol. 5, Issue 12, 2012, pp. 1790-1801.

Li et al., "Semantics and evaluation techniques for window aggregates in data streams", In Proceedings of the 2005 ACM SIGMOD International Conference on Management of Data, SIGMOD '05, pp. 311-322, New York, NY, USA, 2005. ACM.

Liarou et al., "Enhanced stream processing in a dbms kernel", In Proceedings of the 16th International Conference on Extending Database Technology, EDBT'13, pp. 501-512, New York, NY, USA, 2013. ACM.

Liarou et al., "Exploiting the power of relational databases for e_cient stream processing", In Proceedings of the 12th International Conference on Extending Database Technology: Advances in Database Technology, EDBT'09, pp. 323-334, New York, NY, USA, 2009. ACM.

Mondal et al., "Eagr: Supporting continuous ego-centric aggregate queries over large dynamic graphs", SIGMOD '14 Proceedings of the 2014 ACM SIGMOD International Conference on Management of Data, 2014, pp. 1335-1346.

Polyzotis et al., "Meshing streaming updates with persistent data in an active data ware-house", IEEE Transactions on Knowledge and Data Engineering, vol. 20, No. 7, 2008, pp. 976-991.

Tok et al., "E_cient and adaptive processing of multiple continuous queries", In Proceedings of the 8th International Conference on Extending Database Technology: Advances in Database Technology, EDBT'02, pp. 215-232, London, UK, UK, 2002. Springer-Verlag.

Towne et al., "Window query processing for joining data streams with relations", In Proceedings of the 2007 Conference of the Center for Advanced Studies on Collaborative Research, CASCON '07, pp. 188-202, Riverton, NJ, USA, 2007. IBM Corp.

Tran et al., "The Vertica query optimizer: The case for specialized query optimizers", 2014 IEEE 30th International Conference on Data Engineering (ICDE), 2014, pp. 1108-1119.

Varadarajan et al., "Dbdesigner: A customizable physical design tool for vertica analytic database", In IEEE 30th International Conference on Data Engineering, 2014, pp. 1084-1095.

* cited by examiner

PROCESSING QUERY OF DATABASE AND DATA STREAM

BACKGROUND

Many entities (e.g., enterprises, organizations, computer applications, etc.) utilize databases for storage of data relating to the entities. The data in a database may be received from a data stream of incoming data. Data stored in these databases may be accessed and analyzed for various purposes.

BRIEF DESCRIPTION OF THE DRAWINGS

Some examples of the present application are described with respect to the following figures.

DETAILED DESCRIPTION

Figure 1:
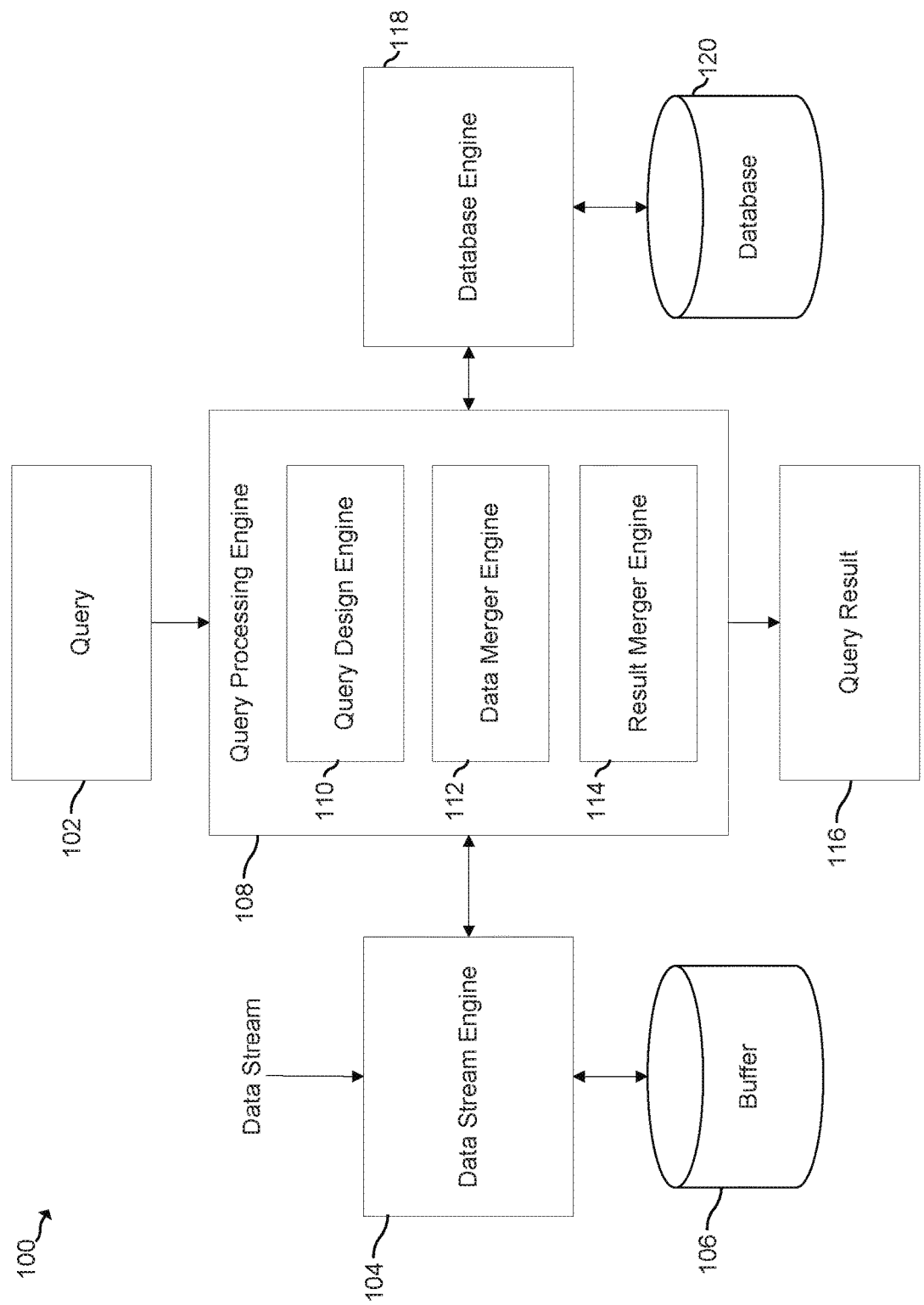
FIG. 1 is a block diagram of an example system for processing a query of a database and a data stream.

As described above, data stored in a database may be accessed and analyzed for various purposes. A query of the data in the database may indicate a particular set of data that is being requested. For example, a user may wish to analyze sales for a particular time range and may query the database for this particular set of sales data. However, for databases receiving incoming data from a data stream, a query for a set of data from the database alone may produce inaccurate results. For example, the incoming data stream may include and/or specify modifications, such as updates, insertions, deletions, and the like, to at least a portion of the database, where those modifications may not be reflected in the results of the query if the database has not yet been modified by the data in the data stream. For example, given a query Q with time window semantics in a generic form that states "find X from a data collection R for data that arrived within the last K time units," if the data collection R contains data that arrived within the last M time units, where M>K, then the query result may not be accurate, as query may have to wait until the data current as of K time units have populated R.

To more efficiently and accurately run a query specifying a range of relevant data, a query may be split into one or more sub-queries according to the age of data to be accessed. A range associated with the query may be identified and used to generate one or more sub-queries, where a sub-query for the data stream may be generated and a sub-query for the database may be generated based on the specified range. The query may be any suitable type of query, such as a discrete query, a continuous query, and the like. The range may be any specified type of range and/or combination of ranges, such as a time range (e.g., a particular month), a count range (e.g., a particular number of events), and the like. A buffer may be used to store data from the data stream, and the sub-query for the data stream may query the buffer.

For example, a query may request data for sales from the previous month. If the data stream buffer includes any data from the previous month, a buffer sub-query relating to the range may be generated to query the data stream buffer for the relevant sales data. If the database includes any data from the previous month, a database sub-query relating to the range may be generated to query the database for the relevant data. If both the data stream buffer and the database include any data from the previous month, a buffer sub-query and a database sub-query may each be generated to query the buffer and the database, respectively, based on the specified range. If data from the previous month may be found only in the data stream buffer (e.g., the database has no data associated with the range specified by the query), the query may be run for only the data stream buffer. If data from the previous month may be found only in the database (e.g., the data stream buffer has no data associated with the range specified by the query), the query may be run for only the database. In some examples, these techniques may be performed by an application in communication with and running on top of a data stream engine and a database engine. While the examples provided herein are described with respect to databases, one of ordinary skill in the art will recognize that a similar approach may be used in any suitable context (e.g., Apache™ Hadoop®).

In some examples, the techniques disclosed herein may be performed for queries of a generic form "Find X from a data collection R for data that arrived over a specified range," where X is the data requested and R is a particular data collection (e.g., database). In some examples, the queries may be queries with no joins and/or no sub-queries. In some examples, a data object stored in a data collection R may either be stored in the buffer or in the database, but not stored in both the buffer and the database. That is, there may be some fixed point such that all tuples arriving before that fixed point appear in the database and all tuples arriving after that fixed point are in the buffer.

The results of the one or more sub-queries may be combined to produce a query result that may be provided in response to the query. The one or more sub-queries may be combined in any suitable manner. In some examples, the one or more sub-queries may each be processed to result in a particular value, and the values resulting from each of the one or more sub-queries may be added together to provide the query result. In other examples, the sub-query results may be concatenated. In other examples, the results of the one or more sub-queries may be combined by accessing the relevant data in the buffer based on the range, sending the relevant data to the database, and processing the one or more sub-queries using the data in the database after the relevant data has been sent to the database. For example, if the buffer sub-query relates to an update to and/or a deletion of data in the database, the relevant data in the buffer may be sent to the database, and the one or more sub-queries may be processed accordingly using the data in the database.

The size of the buffer may be any suitable size. In some examples, the size of the buffer may be dynamically changed based on any suitable criteria. For example, the size of the buffer may be increased if a larger amount of data is to be stored in the buffer. In some examples, the size of the buffer may be discrete while a query is being processed.

Referring now to the figures, FIG. 1 is a block diagram of an example system 100 for processing a query 102 of a database 120 and a data stream. Query 102 may be any type of query specifying a request for a particular set of data that may be stored in database 120 or may be continuously streamed from a data stream managed by data stream engine 104.

Data stream engine 104 may be a hardware-implemented and/or processor-implemented processing engine that may manage and control receipt of a data stream of data to be stored in database 120. The data stream may include any suitable type of data, including data to be inserted in database 120 and/or commands to update and/or delete data in the database previously received from the data stream.

Before data from the data stream is sent to database 120, data stream engine 104 may store the data from the data stream in buffer 106, which may be any suitable type of storage device. Data stream engine 104 may manage and control receipt and processing of queries and/or sub-queries that may query data in buffer 106.

Database engine 118 may be a hardware-implemented and/or processor-implemented processing engine that may manage and control receipt and processing of queries and/or sub-queries that may request data stored in database 120, which may be any suitable type of storage device. Database engine 118 may also manage and control receipt of data from the data stream and may manage and control storage of the data in database 120.

Query processing engine 108 may be a hardware-implemented and/or processor-implemented processing engine that may manage and control the processing of queries, such as query 102. In some examples, query processing engine 108 may be an application that may be in communication with and external to data stream engine 104 and database engine 118 such that the functions of query processing engine 108 may be performed without modification to data stream engine 104 and database engine 118. Query processing engine 108 may include query design engine 110, data merger engine 112, and result merger engine 114.

Query design engine 110 may be a hardware-implemented and/or processor-implemented processing engine that may manage and control the design, generation, and/or creation of one or more sub-queries to be processed based on query 102. For example, query design engine 110 may determine a range associated with query 102 and may use the range to design one or more sub-queries to each be processed with respect to buffer 106 and/or database 120.

Data merger engine 112 may be a hardware-implemented and/or processor-implemented processing engine that may manage and control the transfer of data from buffer 106 to database 120, including managing and controlling the orchestration of the schema mappings between buffer 106 and database 120. In some examples, buffer 106 may have the same schema as database 120, and data merger engine 112 may pull and/or push data from buffer 106 to database 120. Data merger engine 112 may also manage the data in buffer 106 and database 120 such that queries are provided a consistent view of the data as of some point in time. Data merger engine 112 may send data from buffer 106 to database 120 based on any suitable criteria. For example, data merger engine 112 may move data if buffer 106 is full or almost full of data, if additional space is desired in buffer 106, if database 120 becomes available to receive additional data, if a particular amount of time has elapsed since the previous transfer of data to database 120, and the like. In some examples, data is not moved from buffer 106 to database 120 while query 102 is being processed.

Result merger engine 114 may be a hardware-implemented and/or processor-implemented processing engine that may manage and control the generation of query result 116 based on the one or more sub-queries being processed. For example, the one or more sub-queries created from query 102 based on the associated range may be processed with respect to buffer 106 and/or database 120. Once the sub-queries are processed, result merger engine 114 may combine and/or merge the sub-query results to generate query result 116. This may be performed in any suitable manner and in some examples may depend on the semantics of the specified query. In some examples, the one or more sub-queries may each be processed to result in a particular value, and the values resulting from each of the one or more sub-queries may be added together to provide the query result. In other examples, the results of the one or more sub-queries may be combined by accessing the relevant data in the buffer based on the range, sending the relevant data to the database, and processing the one or more sub-queries using the data in the database after the relevant data has been sent to the database.

In some examples, the data being queried by query 102 may reside on persistent storage in a relation R inside database 120, which may be a relational database. A relation may be a set of tuples that share at least one attribute. Relation R may or may not be partitioned across nodes. Each record in relation R may have a timestamp showing when the record was committed to relation R. The data stream consisting of streamed data may update relation R. For example, the data stream may add new information to relation R, update information in relation R, and/or delete data in relation R. Query 102 may probe relation R and may be a discrete or continuous query. A discrete query may be a query with a fixed, static range delimited by time or count values. A continuous query may be a query with a series of ranges or windows such that a query result is computed over a particular range, the range (e.g., its lower and upper bounds) is subsequently moved by some specified amount (e.g., a "sliding" window), and the query is recomputed over the newly defined range, where this process may be repeated until some termination condition is reached. Query 102 may have window semantics specifying a particular range, such as a particular time range. Query design engine 110 may decide whether the data that query 102 requests is stored in relation R, and/or whether that data that has not yet made its way to relation R yet. Based on this analysis by query design planner 110, query 102 may be split into sub-queries that may be sent to database engine 118 managing database 120 and/or data stream engine 104 managing buffer 106 queuing data from the data stream. In the case of a query split, the parts of query 102 that have been evaluated in database 120 and/or buffer 106 may be merged back into a single response (e.g., query result 116) to query 102, which may be performed by result merger engine 114. As such, query result 116 may be provided in response to the query 102.

An example of processing a query of a database and a data stream is provided for explanatory purposes. For example, the following discrete query may be similar to a structured query language (SQL) query and may request the sum of prices for items sold during a day (e.g., a 24-hour period of time):

```
SELECT sum(Price)
FROM Orders
WINDOW Range 24 h
```

This query may contain a WINDOW operation that defines a range (e.g., a time range) for the query results. In this case, the relevant range for this query data may be 24 hours old starting from the time when the query was issued.

In some examples, temporal windows, like "Range 24 hours" may not be supported in some query languages (e.g., SQL). For example, windows may not be supported in some SQL dialects or may have different semantics in other SQL dialects (e.g., they may be relative to the tuple currently being processed by the query). However, these windows may be translated into standard SQL clauses, as shown below in Table 1, which is a table showing SQL translations for various window examples and types of ranges.

The rightmost column of the example of Table 1 below shows example interpretations of the WINDOW operation in SQL. For example, a count-based window can be represented in SQL with an ORDER BY clause on the timestamp attribute and a LIMIT clause based on the window size. For a time-based window, the query is extended with a predicate as "NOW( )−tstamp≤d", where NOW( ) is a function that gives the present time, tstamp is a timestamp attribute, and d is the length of the window's time interval. For example, "Range 24 hours" may be expressed by a predicate "NOW( )−tstamp≤24 hours".

TABLE 1

Window Examples

| Type | Window | Contents | Translation to SQL |
|---|---|---|---|
| Count-based, one time | Rows n | n most recent events | ORDER BY tstamp DESC LIMIT n |
| Count-based, continuous | Size n | n recent events, window slides when a new events become available | ORDER BY tstamp DESC LIMIT n The query is called when a new events become available. |
| Time-based, one time | Time range d | events within most recent time interval of length d | NOW( ) - tstamp ≤ d |
| Time-based, continuous | Time range d and Slide s | events within recent time interval of length d, window slides when new events within the time interval of length s become available | NOW( ) - tstamp ≤ d The query is called when new events within the time interval of length s become available. | where n, a ∈ $\mathbb{N}$,
d, s are durations,
tstamp is the attribute representing event timestamp,
NOW( ) returns the current date and time.

The location of the data requested by this query may be determined. In some examples, the buffer may be checked before checking the database, the database may be checked before checking the buffer, or both locations may be checked.

If the buffer contains data requested by the query, the query design engine may determine how much of the data relevant to the query resides in the buffer. The most recent and the oldest event in the buffer may be determined, and the difference between the timestamps of those events may be computed to determine the time range covered by the data in the buffer. For example, if the time period is 10 hours long, the remainder of the data relevant to the query is in the database (e.g., the remaining 14 hours of the 24-hour time range). As such, the query window may be split into two sub-queries: a buffer sub-query with a 10-hour range and a database sub-query with a 14-hour range. The sub-queries may be processed, and the results of the sub-queries may be combined to generate the query result to the query.

In some examples, the limit of the buffer may be defined in the following ways:
  count-based (nb), where nb is the number of inserted and not deleted relevant events in the buffer
  time-based (db=eb−sb), where sb is the start of the buffer (e.g., timestamp of the oldest event in the buffer) and where eb is the end of the buffer (e.g., timestamp of the most recent event in the buffer)

Several query languages, like modern stream processing languages, may support several kinds of windows. Such windows may be, for example, time-based or count-based for discrete or continuous queries. Table 1 above presents the syntax and semantics of four window types where n and a are natural numbers, d and s are durations (e.g., 1 hour, 10 minutes, etc.). The rightmost column of Table 1 shows an example translation of window semantics in SQL for discrete and continuous queries. The latter is not generally implemented in most SQL dialects, and as such, it is orchestrated from an application external to the database to keep the state and to re-execute the query at appropriate time intervals.

Table 2 below shows window split examples and how each example window may be split into sub-queries based on a range specified in the query. The windows may be split based on the buffer limit, window size, and window slide conditions. Referring to Table 2, n, nb, a, and x are natural numbers; nb is the number of inserted and not deleted events in the buffer; x is the number of new events before the current window; d, db=eb−s, s, and y are durations; db is the time interval during which events are available in the buffer; sb is the start of the buffer (e.g., the timestamp of the oldest event in the buffer); eb is the end of the buffer (e.g., the timestamp of the most recent event in the buffer); and y is the time interval before the current window.

TABLE 2

Window Split Examples

| Case N° | Window | Condition | Window for buffer | Window for database | Windows slide when . . . |
|---|---|---|---|---|---|
| 1 | Rows n | $n_b$ < n | Rows $n_b$ | Rows (n-$n_b$) | n/a |
| 2 | | n ≤ $n_b$ | Rows n | — | |
| 3 | Size n Advance a | $n_b$ < a ≤ n or $n_b$ < n ≤ a | Rows $n_b$ | Rows (n-$n_b$) | x = a |
| 4 | | n ≤ $n_b$ < a | Rows n | — | |
| 5 | | a ≤ $n_b$ < n | Size $n_b$ Advance a | Rows (n-$n_b$) | — |
| 6 | | a ≤ n ≤ $n_b$ or n ≤ a ≤ $n_b$ | Size n Advance a | — | |
| 7 | Range d | $d_b$ < d | Range $d_b$ | Range (d-$d_b$) | n/a |
| 8 | | d ≤ $d_b$ | Range d | — | |
| 9 | Range d Slide s | $d_b$ < s ≤ d or $d_b$ < d ≤ s | Range $d_b$ | Range (d-$d_b$) | y = s |
| 10 | | d ≤ $d_b$ < s | Range d | — | |
| 11 | | s ≤ $d_b$ < d | Range $d_b$ Slide s | Range (d-$d_b$) | — |
| 12 | | s ≤ d ≤ $d_b$ or d ≤ s ≤ $d_b$ | Range d Slide s | — | |

In the example presented above, it was determined that the database contained data older than 10 hours, while the fresher data was stored in the buffer. Because the query window is 24 hours, the query window "Range 24 hours" may be split into two windows: "Range 10 hours" to be applied to the buffer and "Range 14 hours" to be applied to the database. This is an example of case number 7 in Table 2 above. If the buffer contains data for the last 24 hours, no window split is performed, and the original query may be performed by the data stream engine with respect to the buffer. This is an example of case number 8 in Table 2 above.

To illustrate the split of a continuous query window, consider the example window "Range 24 hours Slide 1 week," which may access data within a particular day (e.g., 24-hour time range) of a week and repeat every week. Assuming, for example, that data for the last 3 days resides in the buffer and that the database contains data older than 3 days, the query window "Range 24 hours Slide 1 week" may be converted to "Range 24 hours" and applied to the buffer. In addition, a variable y may keep track of the difference between the timestamp of a newly arrived tuple and the time point of the most recent query call. Once y becomes equal to one week, the query may be called again and y may be reset to zero. The variable y may help to evaluate the query without accessing the database. This is an example of case number 10 in Table 2. In this example, the window may slide forward in time. However, in other examples, a window may slide backward in time (e.g., to query historical data).

In some examples, the techniques disclosed herein may be used to convert a data stream engine to an elastic data stream engine. In this example context, queries over existing data stream engines may be limited to a certain, near-term context defined either by a time range or some number of events. Once that context is exceeded, older events may be purged to make room for more recent events. The techniques disclosed herein may remove that constraint by leveraging a query engine, like a relational database management system (RDBMS) for example, to store older events that are purged from the data stream engine. Queries may then be processed over an arbitrarily long context by accessing data from both engines. For example, consider the case of a single event stream S and a single query Q over the single event stream S. Query Q may be either a discrete query that returns a single result set or a continuous query that returns a series of result sets (e.g., a moving average of stock prices). Assuming that the data stream engine has finite storage capacity for the single event stream S, older events of S in the data stream engine may periodically be persistently stored in a relation R in a database associated with a database engine. Further assume that newer events in S may update or modify older events in S. For example, a stream of data may include an update or a deletion of previous data. In this example, the data requested by query Q may be data that is solely in the buffer, solely in the database, or in both the buffer and the database. The techniques disclosed herein may be used to generate sub-queries based on the query to appropriately retrieve the requested data from either or both the buffer and the database. In some examples, this may be performed while continuously migrating data from S into the database.

Figure 2:
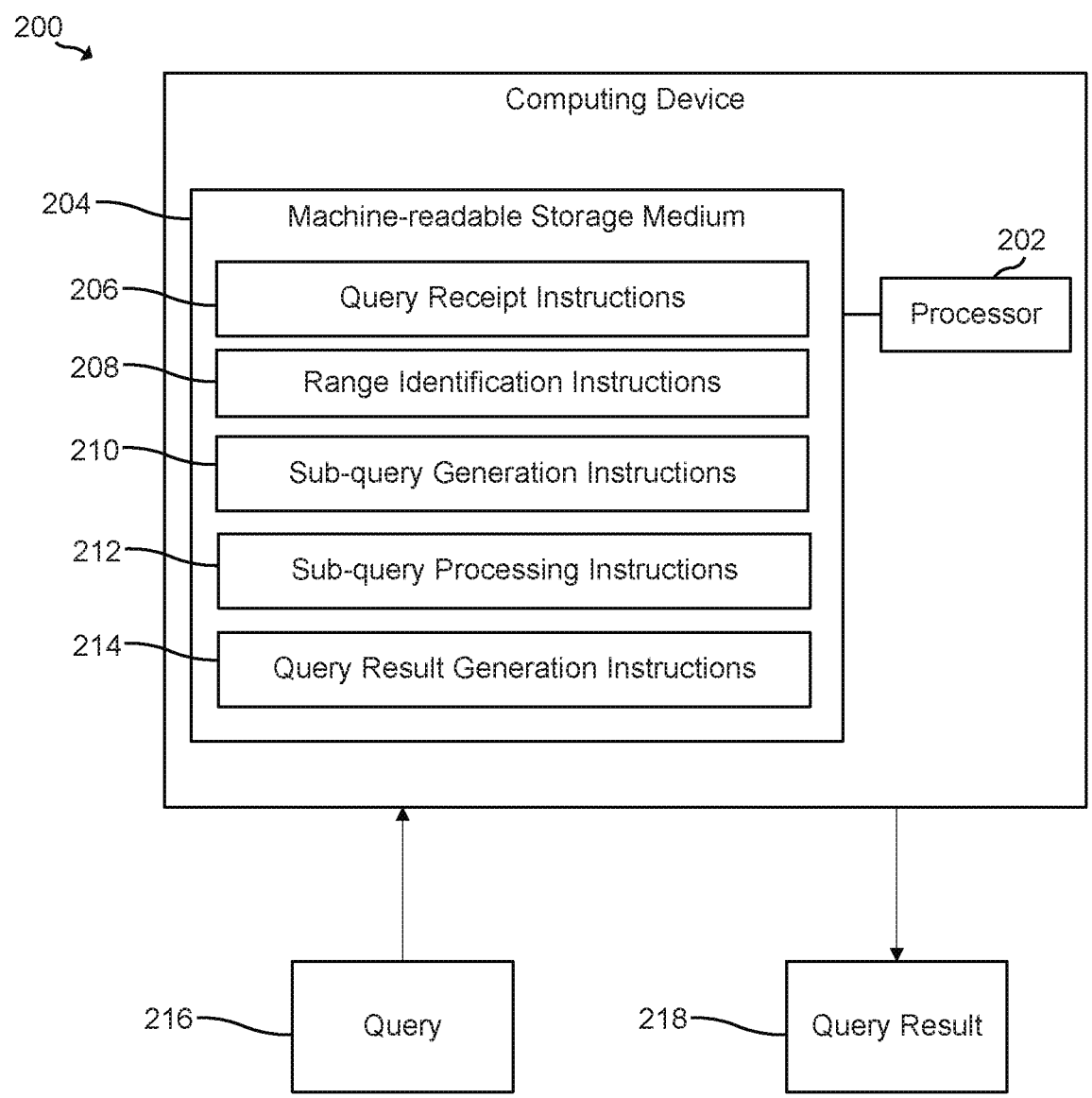
FIG. 2 is a block diagram of a computing device for processing a query of a database and a data stream.

FIG. 2 is a block diagram of an example computing device 200 for processing a query 216 of a database and a data stream. The query 216 may be processed using one or more sub-queries generated based on a range associated with the query 216 to produce query result 218.

Computing device 200 may be, for example, a web-based server, a local area network server, a cloud-based server, a notebook computer, a desktop computer, an all-in-one system, a tablet computing device, a mobile phone, an electronic book reader, a printing device, or any other electronic device suitable for processing a query (e.g., query 216) of a database and a data stream. Computing device 200 may include a processor 202 and a machine-readable storage medium 204. Computing device 200 may generate a set of sub-queries including at least one of a buffer sub-query and a database sub-query based on the range associated with the query and may process the set of sub-queries to provide a query result of the query.

Processor 202 is a tangible hardware component that may be a central processing unit (CPU), a semiconductor-based microprocessor, and/or other hardware devices suitable for retrieval and execution of instructions stored in machine-readable storage medium 204. Processor 202 may fetch, decode, and execute instructions 206, 208, 210, 212, and 214 to control a process of processing a query of a database and a data stream. As an alternative or in addition to retrieving and executing instructions, processor 202 may include at least one electronic circuit that includes electronic components for performing the functionality of instructions 206, 208, 210, 212, 214, or a combination thereof.

Machine-readable storage medium 204 may be any electronic, magnetic, optical, or other physical storage device that contains or stores executable instructions. Thus, machine-readable storage medium 204 may be, for example, Random Access Memory (RAM), an Electrically Erasable Programmable Read-Only Memory (EEPROM), a storage device, an optical disc, and the like. In some examples, machine-readable storage medium 204 may be a non-transitory storage medium, where the term "non-transitory" does not encompass transitory propagating signals. As described in detail below, machine-readable storage medium 204 may be encoded with a series of processor executable instructions 206, 208, 210, 212, and 214 for receiving a query (e.g., query 216) associated with at least one of a database and a buffer storing streamed data from a data stream, the database storing database data previously stored in the buffer; identifying a range associated with the query; generating a set of sub-queries including at least one of a buffer sub-query if the range is associated with the streamed data in the buffer and a database sub-query if the range is associated with the database data in the database; processing the set of sub-queries; and providing a query result (e.g., query result 218) of the query, the query result being a combination of sub-query results of the set of sub-queries.

Query receipt instructions 206 may manage and control receipt of queries, such as query 216. Query 216 may indicate a particular set of data being requested with respect to at least one of a database of data and/or a data stream of data that may update the database. Data from the data stream may be stored in a buffer before being sent to the database. For example, query receipt instructions 206 may manage and control receipt of query 216 requested from a user.

Range identification instructions 208 may manage and control the identification and/or determination of a particular range associated with queries, such as query 216. For example, query 216 may request data associated with a particular time range, and range identification instructions 208 may identify the particular time range specified by query 216.

Sub-query generation instructions 210 may manage and control the generation and/or creation of a set of sub-queries. The set of sub-queries may include at least one of a buffer sub-query and a database sub-query. A buffer sub-query may be generated if the range specified by query 216 is associated with streamed data in the buffer associated with the data stream. A database sub-query may be generated if the range specified by query 216 is associated with data in the database.

Sub-query processing instructions 212 may manage and control processing of the set of sub-queries. For example, if a buffer sub-query were generated, sub-query processing instructions 212 may process the buffer sub-query with respect to the buffer storing streamed data. If a database sub-query were generated, sub-query processing instructions 212 may process the database sub-query with respect to the data in the database.

Query result generation instructions 214 may manage and control the generation of query result 218 of query 216 based on the set of sub-queries. Query result generation instructions 214 may combine sub-query results of the set of sub-queries to generate query result 218. In some examples, the one or more sub-queries in the set of sub-queries may each be processed to result in a particular value, and the values resulting from each of the one or more sub-queries may be added together to provide query result 218. In other examples, the results of the one or more sub-queries may be combined by accessing the relevant data in the buffer based on the range, sending the relevant data to the database, and processing the one or more sub-queries using the data in the database after the relevant data has been sent to the database to provide query result 218.

Figure 3:
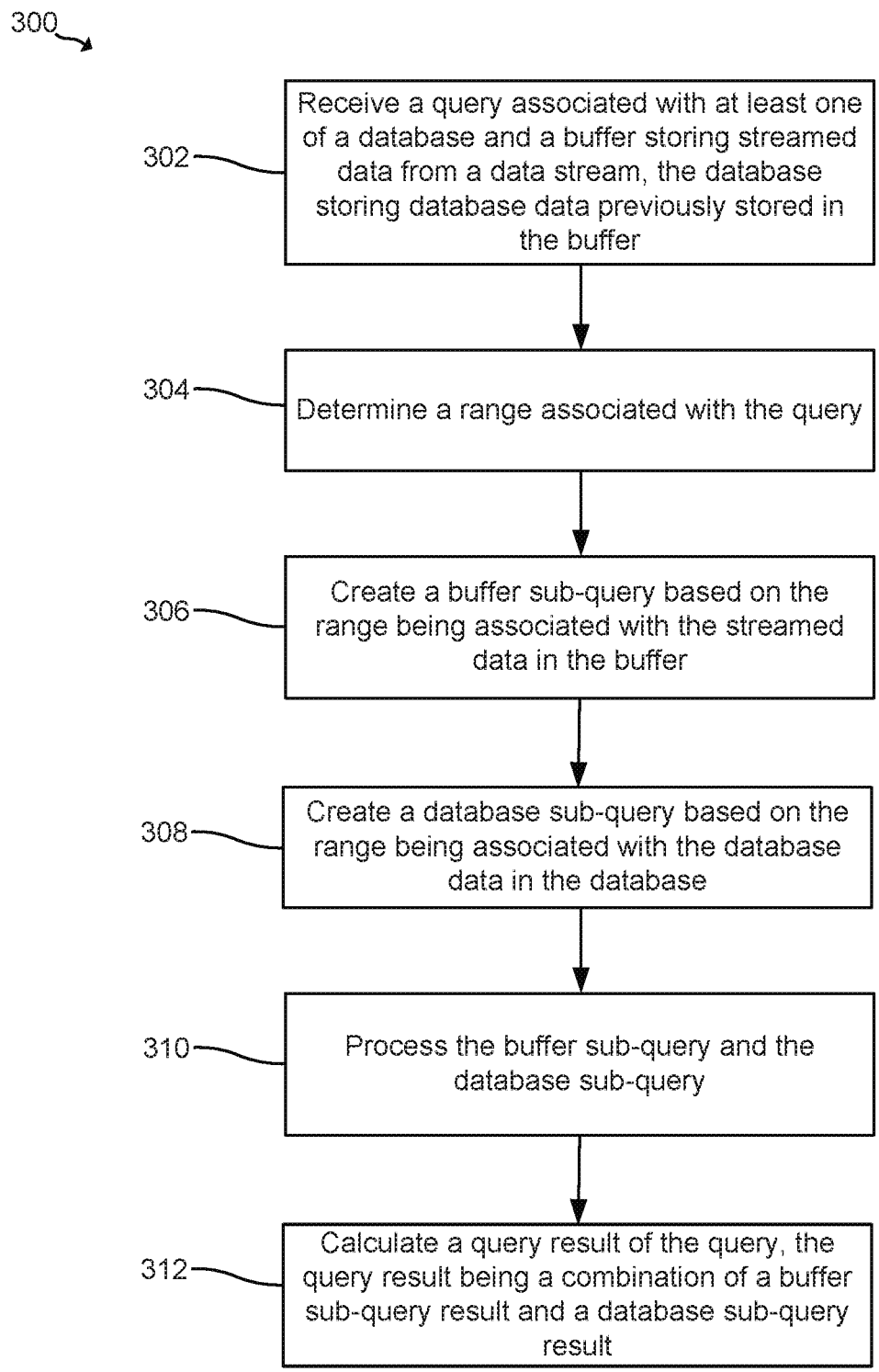
FIG. 3 is a flowchart illustrating an example method of processing a query of a database and a data stream.

FIG. 3 is a flowchart illustrating an example method 300 of processing a query of a database and a data stream. Method 300 may be implemented using computing device 200 of FIG. 2.

Method 300 includes, at 302, receiving a query associated with at least one of a database and a buffer storing streamed data from a data stream, the database storing database data previously stored in the buffer. The query received may be any type of query specifying a request for data with respect to the database and/or the data stream.

Method 300 also includes, at 304, determining a range associated with the query. The range may be any suitable type of range, such as a time range, a count range, and the like.

Method 300 also includes, at 306, creating a buffer sub-query based on the range being associated with the streamed data in the buffer. For example, if the buffer includes data within at least a portion of the range, a buffer sub-query may be generated based on that portion of the range to query the buffer data.

Method 300 also includes, at 308, creating a database sub-query based on the range being associated with the database data in the database. For example, if the database includes data within at least a portion of the range, a database sub-query may be generated based on that portion of the range to query the buffer data.

Method 300 also includes, at 310, processing the buffer sub-query and the database sub-query. For example, a data stream engine may process the buffer sub-query to return results in response to the buffer sub-query, and a database engine may process the database sub-query to return results in response to the database sub-query.

Method 300 also includes, at 312, calculating a query result of the query, the query result being a combination of a buffer sub-query result and a database sub-query result. The buffer sub-query result and the database sub-query result may be combined in any suitable manner, as described above.

Examples provided herein (e.g., methods) may be implemented in hardware, software, or a combination of both.

Example systems may include a controller/processor and memory resources for executing instructions stored in a tangible non-transitory medium (e.g., volatile memory, non-volatile memory, and/or machine-readable media). Non-transitory machine-readable media can be tangible and have machine-readable instructions stored thereon that are executable by a processor to implement examples according to the present disclosure.

An example system can include and/or receive a tangible non-transitory machine-readable medium storing a set of machine-readable instructions (e.g., software). As used herein, the controller/processor can include one or a plurality of processors such as in a parallel processing system. The memory can include memory addressable by the processor for execution of machine-readable instructions. The machine-readable medium can include volatile and/or non-volatile memory such as a random access memory ("RAM"), magnetic memory such as a hard disk, floppy disk, and/or tape memory, a solid state drive ("SSD"), flash memory, phase change memory, and the like.

What is claimed is:

1. A computing device comprising:
a processor to:
receive a query for data associated with at least one of a database and a buffer storing streamed data from a data stream, the database storing database data previously stored in the buffer, wherein a data merger engine manages the data in the buffer and the database such that queries are provided a consistent view of the data as of some point in time;
identify a range associated with the query, where the range includes time range and count range;
determine whether the range is associated with a database or a buffer storing streamed data from a data stream, the database storing database data previously stored in the buffer wherein the data is not moved from the buffer to the database while query is being processed;
check the database and the buffer to determine location of the data requested by the query;
generate a set of sub-queries by splitting the query based on age of data to be accessed, wherein the sub-quires includes:
a buffer sub-query if the range is determined to be associated with the streamed data in the buffer, and
a database sub-query if the range is determined to be associated with the database data in the database;
process the set of sub-queries to result in a particular value; and
provide a query result of the query, the query result being a combination of sub-query results of the set of sub-queries by accessing relevant data in the buffer based on the range, sending the relevant data to the database, and processing the one or more sub-queries using the data in the database after the relevant data has been sent to the database to provide query result.

2. The computing device of claim 1, wherein the streamed data specifies modifications to at least a portion of the database data, the modifications including at least one of an update, an insertion, and a deletion.

3. The computing device of claim 1, wherein the query is a discrete query.

4. The computing device of claim 1, wherein the query is a continuous query.

5. A method comprising:
receiving, by a computing device, a query for data associated with at least one of a database and a buffer storing streamed data from a data stream, the database storing database data previously stored in the buffer, wherein a data merger engine manages the data in the buffer and the database such that queries are provided a consistent view of the data as of some point in time;

determining, by the computing device, a range associated with the query, wherein the range includes time range and count range;

determining whether the range is associated with at least one of a database and a buffer storing streamed data from a data stream, the database storing database data previously stored in the buffer, wherein the data is not moved from the buffer to the database while the query is being processed;

checking the database and the buffer to determine a location of the data requested by the query;

creating, by the computing device, a buffer sub-query based on the range being determined to be associated with the streamed data in the buffer;

creating, by the computing device, a database sub-query based on the range being determined to be associated with the database data in the database;

processing, by the computing device, the buffer sub-query and the database sub-query to result in a particular value; and calculating, by the computing device, a query result of the query, the query result being a combination of a buffer sub-query result of the buffer sub-query and a database sub-query result of the database sub-query by accessing relevant data in the buffer based on the range, sending the relevant data to the database, and processing the one or more sub-queries using the data in the database after the relevant data has been sent to the database to provide query result.

6. The method of claim 5, wherein the streamed data specifies modifications to at least a portion of the database data, the modifications including at least one of an update, an insertion, and a deletion.

7. The method of claim 5, wherein the query is a discrete query.

8. The method of claim 5, wherein the query is a continuous query.

9. A non-transitory machine-readable storage medium storing instructions that, if executed by at least one processor of a computing device, cause the computing device to:

receive a query for data associated with at least one of a database and a buffer storing streamed data from a data stream, the database storing database data previously stored in the buffer, wherein a data merger engine manages the data in the buffer and the database such that queries are provided a consistent view of the data as of some point in time;

identify a range associated with the query, wherein the range includes time range and count range;

determine whether the range is associated with at least one of a database and a buffer storing streamed data from a data stream, the database storing database data previously stored in the buffer, wherein the data is not moved from the buffer to the database while the query is being processed;

check the database and the buffer to determine a location of the data requested by the query;

create a buffer sub-query based on the range being determined to be associated with the streamed data in the buffer and a database sub-query based on the range being determined to be associated with the database data in the database;

process the buffer sub-query and the database sub-query to result in a particular value; and generate a query result of the query, the query result being a combination of a buffer sub-query result of the buffer sub-query and a database sub-query result of the database sub-query by accessing relevant data in the buffer based on the range, sending the relevant data to the database, and processing the one or more sub-queries using the data in the database after the relevant data has been sent to the database to provide query result.

10. The non-transitory machine-readable storage medium of claim 9, wherein the streamed data specifies modifications to at least a portion of the database data, the modifications including at least one of an update, an insertion, and a deletion.

11. The non-transitory machine-readable storage medium of claim 9, wherein the query is a discrete query.

12. The non-transitory machine-readable storage medium of claim 9, wherein the query is a continuous query.

* * * * *